US012725976B2

(12) United States Patent
Hu

(10) Patent No.: US 12,725,976 B2
(45) Date of Patent: Sep. 1, 2026

(54) ENCODING DEVICE AND CONNECTOR INSERT ASSEMBLY

(71) Applicant: HARTING ELECTRIC STIFTUNG & CO. KG, Espelkamp (DE)

(72) Inventor: Kenny Hu, Zhuhai (CN)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 337 days.

(21) Appl. No.: 18/683,717

(22) PCT Filed: Aug. 8, 2022

(86) PCT No.: PCT/DE2022/100571
§ 371 (c)(1),
(2) Date: Feb. 14, 2024

(87) PCT Pub. No.: WO2023/025349
PCT Pub. Date: Mar. 2, 2023

(65) Prior Publication Data
US 2025/0132524 A1 Apr. 24, 2025

(30) Foreign Application Priority Data
Aug. 24, 2021 (CN) ........................ 202111001271.7

(51) Int. Cl.
*H01R 13/645* (2006.01)

(52) U.S. Cl.
CPC ................................ *H01R 13/6453* (2013.01)

(58) Field of Classification Search
CPC ......................... H01R 13/645; H01R 13/6453
See application file for complete search history.

(56) References Cited

U.S. PATENT DOCUMENTS 6,059,600 A * 5/2000 Vanbesien ............ H01R 13/629 439/378
6,394,856 B1 * 5/2002 Wertz .................. H01R 13/645 439/681

(Continued)

FOREIGN PATENT DOCUMENTS

CN 202076605 U 12/2011
DE 2231480 A1 1/1974

(Continued)

OTHER PUBLICATIONS

International Search Report and Written Opinion, mailed Oct. 28, 2022, for International Patent Application No. PCT/DE2022/100571. (11 pages) (with English translation of International Search Report).

(Continued)

*Primary Examiner* — Tho D Ta
(74) *Attorney, Agent, or Firm* — Seed Intellectual Property Law Group LLP

(57) ABSTRACT

An encoding device is provided that includes a first encoding part and a second encoding part which are attached to a connector insert assembly, wherein the first encoding part is detachably installed in the first connector insert of the connector insert assembly, and wherein the second encoding part is detachably installed in the second connector insert of the connector insert assembly, and wherein the first encoding part includes a first mating part which is located at the front end of the first encoding part in the insertion direction, and wherein the second encoding part includes a second mating part which is located at the front end of the second encoding part in the insertion direction, and wherein the first mating part and the second mating part are arranged such that, when the first connector insert is inserted into the second connector insert, the first mating part and the second mating part can only fit together in a single orientation in order to (Continued)

prevent mismatching between the first connector insert and the second connector insert. A connector insert assembly with such an encoding device is also provided. The encoding device prevents mismatching between the connector inserts and makes it possible for the installation of the connector insert assembly to be simplified.

9 Claims, 9 Drawing Sheets

(56) References Cited

U.S. PATENT DOCUMENTS

| | | | | |
|---|---|---|---|---|
| 7,892,043 | B1 * | 2/2011 | Orand | H01R 13/6453 439/681 |
| 10,985,500 | B2 * | 4/2021 | Grandcoing | H01R 13/641 |
| 11,189,969 | B2 * | 11/2021 | Soefker | H01R 13/645 |
| 2009/0209140 | A1 * | 8/2009 | Heggemann | H01R 13/6453 439/680 |
| 2020/0366032 | A1 | 11/2020 | Soefker | |

FOREIGN PATENT DOCUMENTS

| | | | |
|---|---|---|---|
| DE | 10 2019 112 532 | A1 | 11/2020 |
| GB | 1441656 | A | 7/1976 |

OTHER PUBLICATIONS

International Preliminary Report on Patentability, dated Feb. 27, 2024, for International Patent Application No. PCT/DE2022/100571. (7 pages).

* cited by examiner

ENCODING DEVICE AND CONNECTOR INSERT ASSEMBLY

BACKGROUND

Technical Field

The present disclosure relates to an encoding device for a connector insert assembly and to a connector insert assembly, in which the connector may be designed as an industrial plug connector such as a heavy-duty plug connector.

Description of the Related Art

The connectors are substantially used for electrical connections or signal connections between different devices, wherein the field of use is relatively broad.

In the prior art, multiple connectors are usually used to achieve different functions. However, the connectors in the prior art, such as heavy-duty connectors, are bulky and comprise numerous accessories, wherein they must normally be connected to one another at the same time during use. Therefore, it is time-consuming and labor-intensive to assemble these connectors. It is easy for mismatching between different connectors to occur, as a result of which the performance of the connectors is impaired. At present, a simultaneous connection of multiple connectors is usually identified by different identifiers. However, it is difficult to avoid the occurrence of mismatching by the identifiers.

BRIEF SUMMARY

Embodiments of the disclosure provide an encoding device for a connector insert assembly and a connector insert assembly, wherein the encoding device can prevent mismatching between the connector inserts and can make it possible for the installation of the connector insert assembly to be simplified.

In one embodiment, an encoding device is provided, including a first encoding part and a second encoding part which are attached to a connector insert assembly, wherein the first encoding part is used to be detachably installed in the first connector insert of the connector insert assembly, and wherein the second encoding part is used to be detachably installed in the second connector insert of the connector insert assembly, and wherein the first encoding part includes a first mating part which is located at the front end of the first encoding part in the insertion direction, and wherein the second encoding part includes a second mating part which is located at the front end of the second encoding part in the insertion direction, and wherein the first mating part and the second mating part are arranged such that, when the first connector insert is inserted into the second connector insert, the first mating part and the second mating part can only fit together in a single orientation in order to prevent mismatching between the first connector insert and the second connector insert.

In at least one embodiment, the first mating part is designed as a slot extending in the insertion direction, wherein the second mating part is designed as a projection extending in the insertion direction, and wherein, when the projection is inserted into the slot, a rotation between the first encoding part and the second encoding part can be prevented. In some embodiments, the slot is designed as an elongate T-shaped groove, wherein the projection is designed as an elongate T-shaped projection, and wherein the extension of the T-shaped projection in the insertion direction is smaller than the extension of the T-shaped groove in the insertion direction.

A person skilled in the art in this field shall understand that the "insertion direction" mentioned in this connection relates to the installation direction of the first connector insert and of the second connector insert and also to an installation direction of the first encoding part in the first connector insert and of the second encoding part in the second connector insert, wherein the first connector insert and the second connector insert have opposing "insertion directions".

In one embodiment, the first encoding part and the second encoding part each include a guide part, wherein the guide parts are used to guide the first encoding part and the second encoding part into the corresponding connector insert.

In some embodiments, the guide parts are each projections arranged on the periphery of the first encoding part and of the second encoding part, wherein the projections are each arranged close to the rear end of the first encoding part and of the second encoding part in the insertion direction, and wherein the projections are used to fit into the cut-outs in the corresponding connector insert, and wherein, when the first connector insert is inserted into the second connector insert, the front end of the projections in the insertion direction is blocked by the blocking part on the corresponding connector insert in order to prevent the first encoding part and the second encoding part being inserted further in the insertion direction.

In one embodiment, the first encoding part and the second encoding part each include a locking part in order to lock the first encoding part and the second encoding part in the corresponding connector insert.

In some embodiments, the locking parts may be each situated on the rear end of the first encoding part and of the second encoding part in the insertion direction, wherein the locking parts are each formed in multiple elastic pieces, which are adjacent to one another, and wherein, when the first encoding part and the second encoding part are inserted into the correct position in the corresponding connector insert, the locking parts lock the first encoding part and the second encoding part in the axial direction on the corresponding connector insert by a spring force in order to prevent the first encoding part and the second encoding part detaching outward in a direction opposite the insertion direction.

The elastic pieces are inclined further outward in a direction opposite the insertion direction, wherein the inclination angle is 10° to 65°. By setting the angle, a locking of the first encoding part in the first connector insert and of the second encoding part in the second connector insert can be optimized.

According to another embodiment, a connector insert assembly including an above-mentioned encoding device is provided.

According to some embodiments, it is possible to prevent mismatching during installation of the connector inserts by providing a mating portion. By providing the guide part and the locking part, a simple and reliable installation of the encoding device in the connector insert assembly can be ensured. The encoding device described herein can also be adapted for the rapid and reliable installation of large and heavy plug connectors.

BRIEF DESCRIPTION OF THE SEVERAL VIEWS OF THE DRAWINGS

Embodiments of the present disclosure are explained in more detail below with reference to the figures.

DETAILED DESCRIPTION

The present disclosure is explained in more detail below in connection with the embodiments and figures. In the description, identical or similar reference signs indicate the same or similar components. The following explanations of the embodiment of the present disclosure in connection with the figures are used to explain the overall concept of the present disclosure and are not to be understood as a limitation of the present disclosure.

Figure 1:
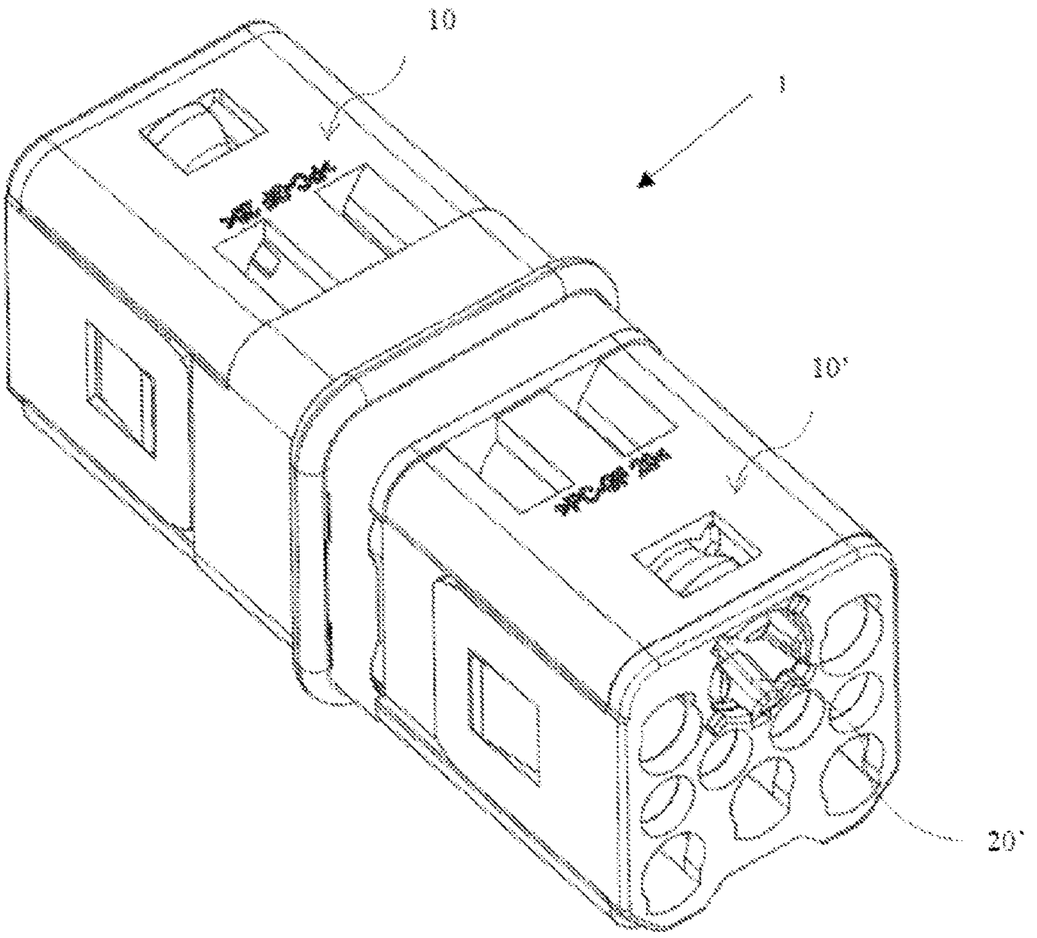
FIG. 1 is a perspective diagram of a connector insert assembly according to an embodiment of the present disclosure, wherein an encoding device is installed in the connector insert assembly.
Figure 2:
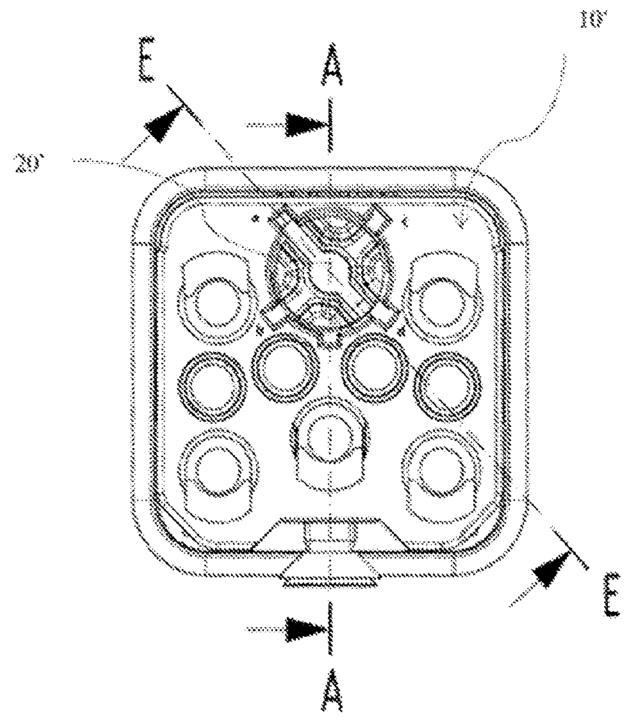
FIG. 2 is a front view of the connector insert assembly according to FIG. 1.

FIG. 1 to FIG. 6 show a connector insert assembly 1 according to an embodiment of the present disclosure. As shown in FIG. 1 and FIG. 2, the connector insert assembly 1 comprises a female connector insert 10, a male connector insert 10', which fits together with the female connector insert, and an encoding device (which is shown in more detail in FIG. 3 and FIG. 4). The encoding device comprises a first encoding part 20 (not shown in FIG. 1 and FIG. 2), which is situated in the female connector insert 10, and a second encoding part 20', which is situated in the male connector insert 10', of which only the second encoding part 20' is shown in FIG. 1 and FIG. 2.

Figure 3:
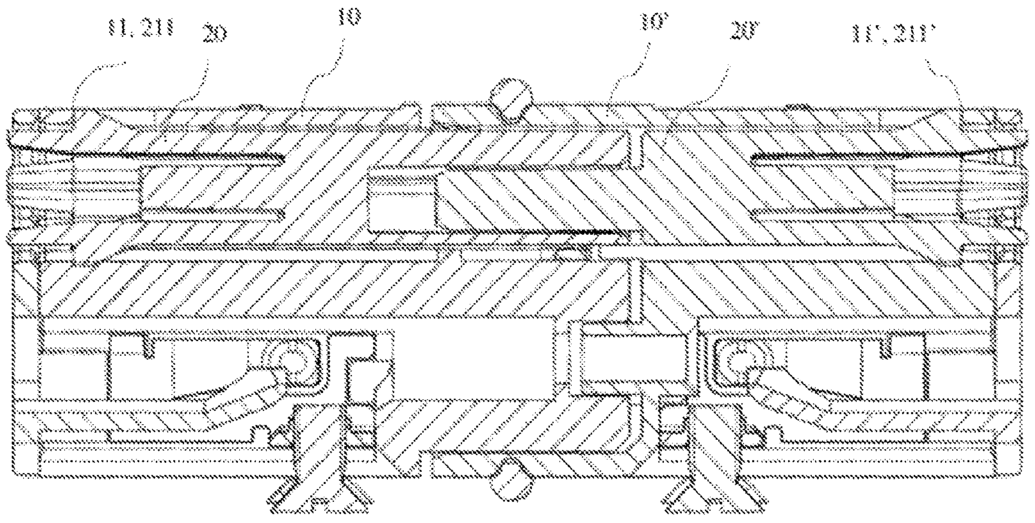
FIG. 3 is a longitudinal sectional view of the connector insert assembly according to FIG. 2 along line A-A.
Figure 4:
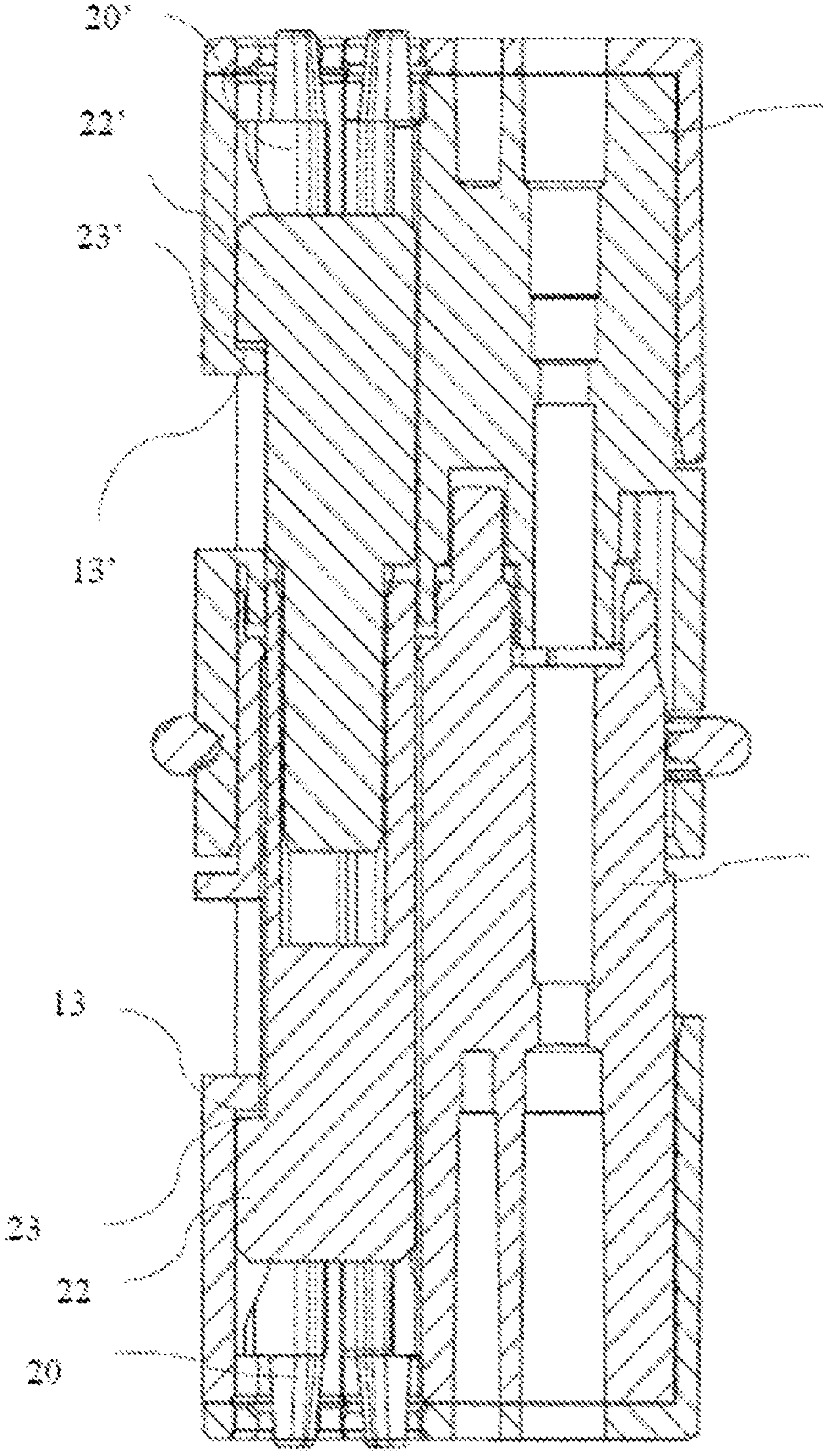
FIG. 4 is a longitudinal sectional view of the connector insert assembly according to FIG. 2 along line E-E.

FIGS. 3 and 4 show a longitudinal sectional view of the connector insert assembly 1 along line A-A and along line E-E, respectively. The female connector insert 10 and the male connector insert 10' are connected interactively by the first encoding part 20 and the second encoding part 20', wherein an end of the second encoding part 20' is inserted (i.e., detachably installed) into a respective end of the first encoding part 20, as a result of which the female connector insert 10 and the male connector insert 10' can be connected in order to prevent the first encoding part 20 from detaching outward in a direction opposite the insertion direction.

As shown in FIG. 3, the first encoding part 20 comprises a locking part which is arranged on its rear end in the insertion direction, wherein the locking part (or the locking mechanism) is used to lock the first encoding part 20 on the female connector 10. The locking part 21 of the first encoding part 20 comprises a bearing face 211, which bears against an opening 11 in one end of the female connector insert 10, as a result of which the first encoding part 20 is positioned on the female connector insert 10. Correspondingly to the first encoding part 20, the second encoding part 20' also comprises a locking part 21' which is arranged on its rear end in the insertion direction, wherein the locking part is used to lock the second encoding part 20' on the male connector 10'. The locking part 21' of the second encoding part 20' in FIG. 3 is the same as the locking part 21 of the first encoding part 20 and comprises a bearing face 211', which bears against an opening 11' in one end of the male connector insert 10', as a result of which the second encoding part 20' is positioned in the male connector insert 10' in order to prevent the second encoding part 20' from detaching outward in a direction opposite the insertion direction.

A person skilled in the art in this field shall understand that the locking part of the first encoding part 20 can be different from the locking part of the second encoding part 20' as long as a corresponding encoding part can lock with respect to a corresponding connector insert by the locking part.

FIG. 4 shows the assembling of the encoding device in the connector insert assembly 1. The first encoding part 20 has on its periphery a first guide part 22 for guiding the first encoding part 20 into the female connector insert 10. The first guide part 22 comprises at its front end in the insertion direction a first stop face 23 for interaction with a corresponding stop collar 13 on the female connector insert 10 so that the first encoding part 20 is limited axially, such as in the insertion direction, in order to prevent the first encoding part 20 being inserted further into the female connector insert 10 in the insertion direction. Correspondingly, the second encoding part 20', like the first encoding part 20, also comprises on its periphery a second guide part 22' for guiding the second encoding part 20' into the male connector insert 10'. The second guide part 22' comprises at its front end in the insertion direction a second stop face 23' for interaction with a corresponding stop collar 13' on the male connector insert 10' so that the second encoding part 20' is limited axially, such as in the insertion direction, in order to prevent the second encoding part 20' being inserted further into the male connector insert 10' in the insertion direction.

A person skilled in the art in this field shall however understand that the first guide part 22 and the second guide part 22' can have different structures as long as they can guide and limit the corresponding encoding part.

Figure 5:
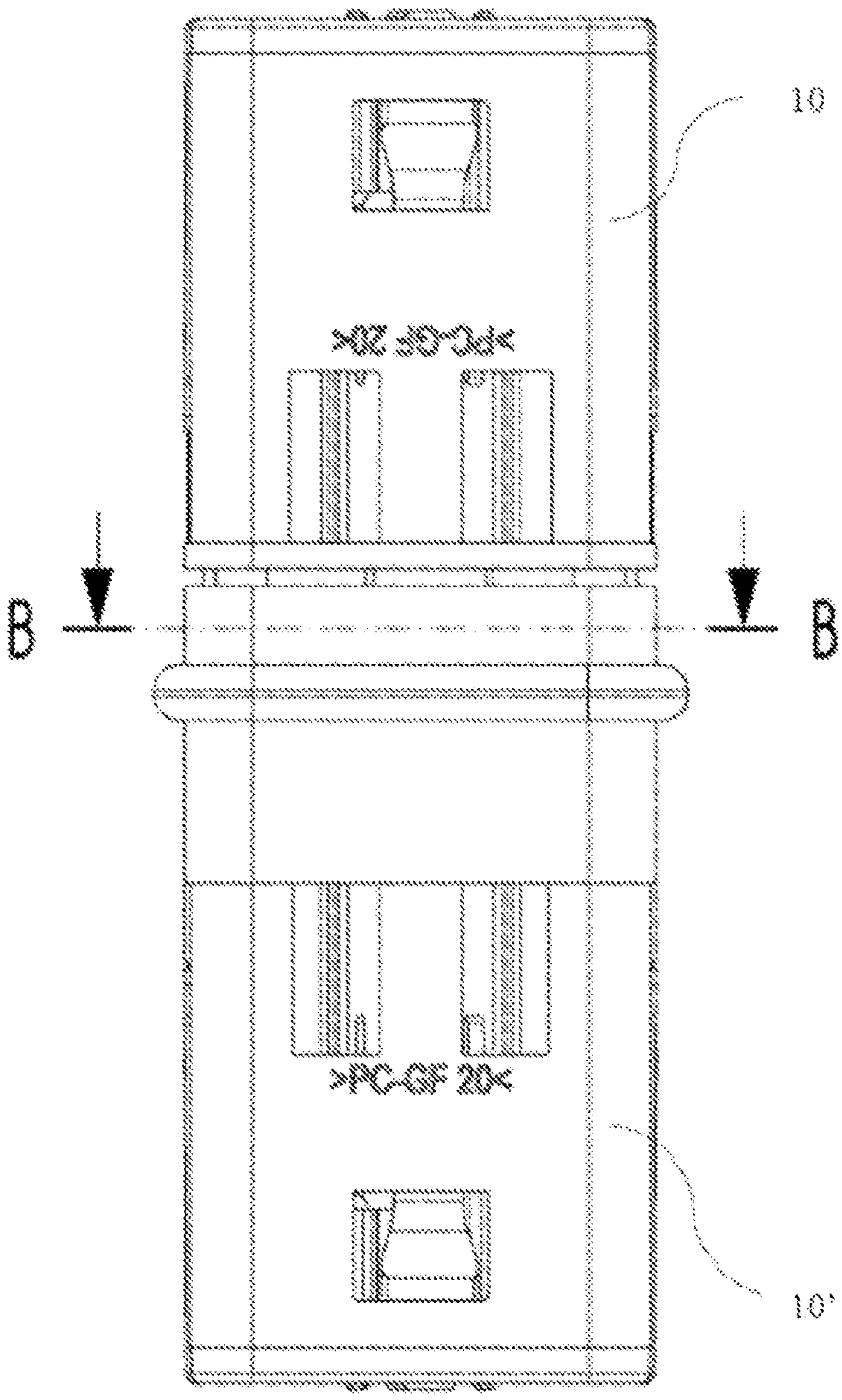
FIG. 5 is a plan view of the connector insert assembly according to FIG. 1.
Figure 6:
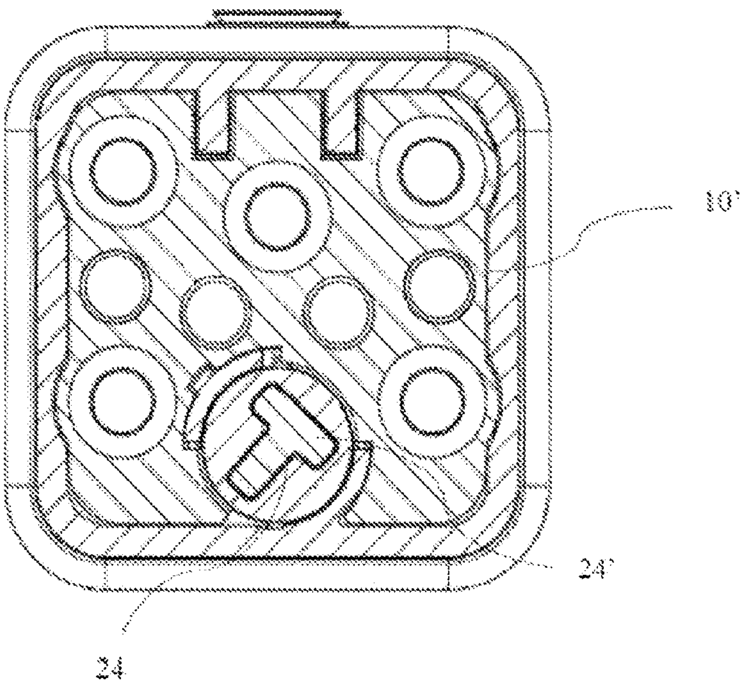
FIG. 6 is a cross-sectional view of the connector insert assembly according to FIG. 5 along line B-B.

FIG. 6 shows a cross-sectional view of the connector insert assembly 1 according to FIG. 5 along line B-B. As shown in FIG. 6, the cross section B-B is actually arranged on the male connector insert 10'. FIG. 6 mainly shows a mating portion of the first encoding part 20 and of the second encoding part 20', wherein the mating portion comprises a first mating part 24 on the first encoding part 20 and a second mating part 24' on the second encoding part 20', wherein the first mating part 24 and the second mating part 24' form a form-fitting structure. As shown in FIG. 6, the first mating part 24 is designed as a T-shaped groove, which is arranged in the insertion direction on the first encoding part 20. The second mating part 24' is designed as a T-shaped projection, which is arranged in the insertion direction on the second encoding part 20'. A person skilled in the art in this field shall understand that the shape of the mating portion is not limited only hereto but that different interlocking shapes are possible, such as other regular or irregular polygonal shapes, such as I-shaped shapes, as long as a rotation between the first encoding part 20 and the second encoding part 20' can be prevented when the projection is inserted into the slot.

Figure 7:
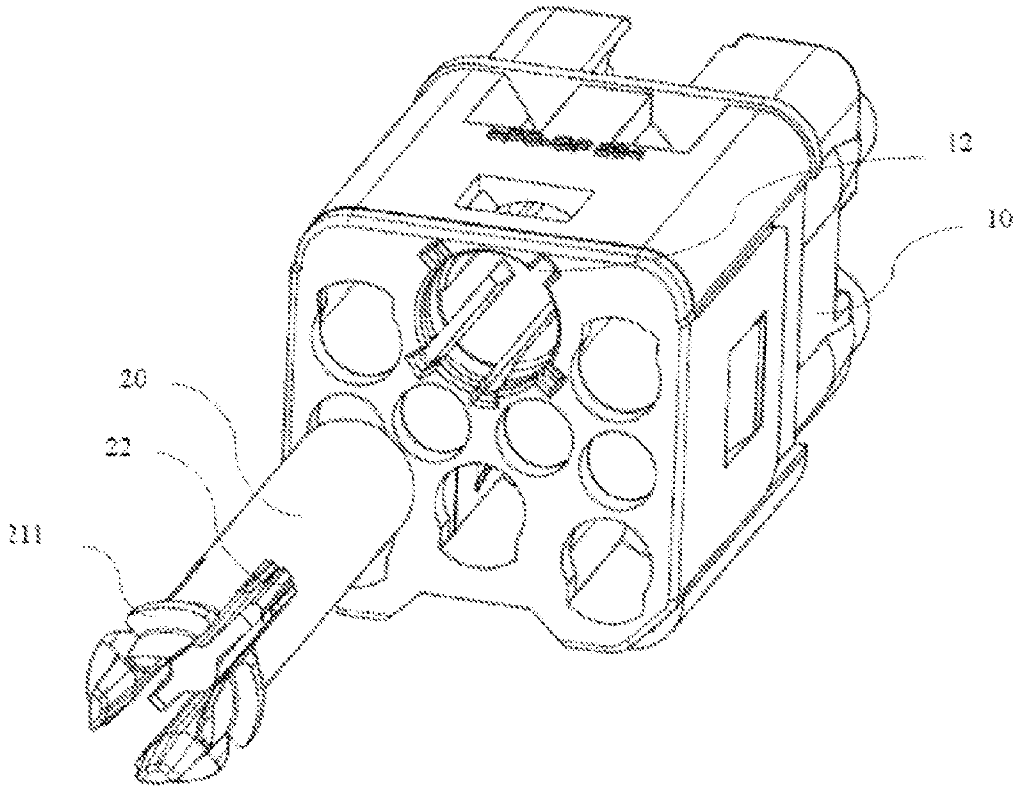
FIG. 7 is a perspective exploded view of a connector insert and of an encoding part in the connector insert assembly according to FIG. 1, wherein the connector insert is a female connector insert.
Figure 8:
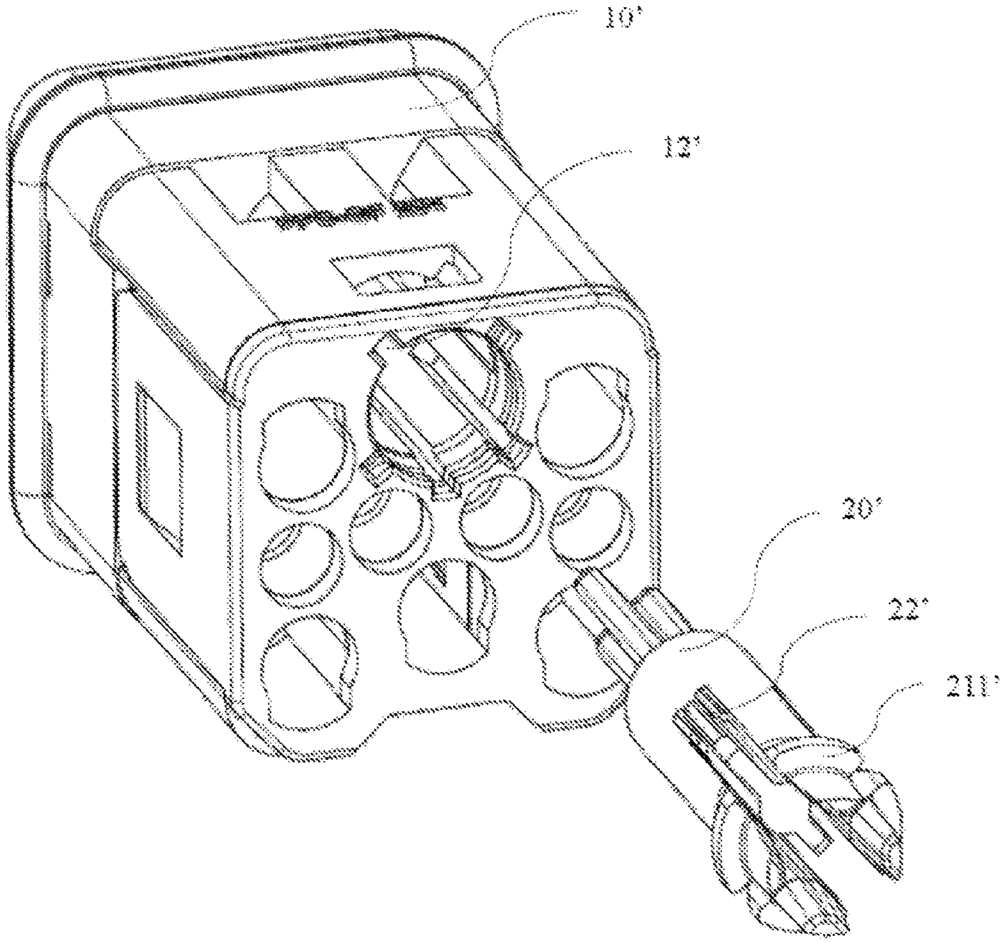
FIG. 8 is a perspective exploded view of a connector insert and of an encoding part from the connector insert assembly according to FIG. 1, wherein the connector insert is a male connector insert.

FIG. 7 shows a perspective exploded view of the female connector insert 10 and of the first encoding part 20, and FIG. 8 shows a perspective exploded view of the male connector insert 10' and of the second encoding part 20'.

FIG. 7 shows that the first encoding part 20 comprises the previously mentioned first guide part 22, which is a projection that is arranged close to the rear end of the first encoding part 20 in the insertion direction and is used to fit into the guide cut-out 12 in the female connector insert 10. FIG. 7 also shows the previously mentioned bearing face 211, which is used, as described above, to bear against the opening 11 in the female connector insert 10, as a result of which the first encoding part 20 is locked in the female connector insert 10.

Correspondingly, FIG. 8 shows that the second encoding part 20' comprises the previously mentioned second guide part 22', that a projection is present that is arranged close to the rear end of the second encoding part 20' in the insertion direction and is used to fit into the guide cut-out 12' in the male connector insert 10'. FIG. 8 also shows the previously mentioned bearing face 211', which is used to bear against the opening 11' in the male connector insert 10', as a result of which the first encoding part 20' is locked in the male connector insert 10'.

Figure 9:
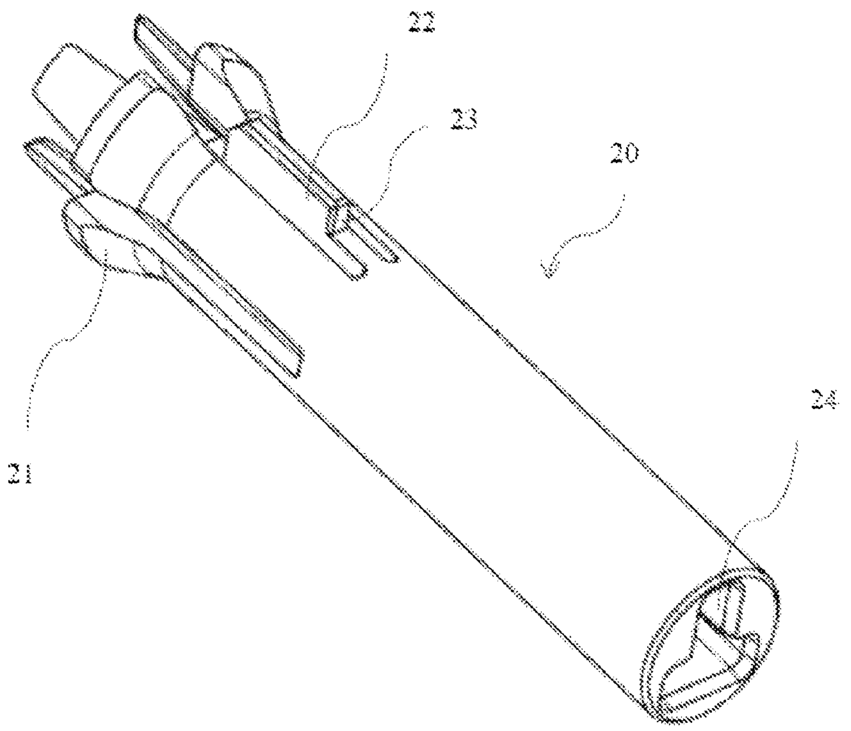
FIG. 9 is a perspective diagram of the encoding part according to FIG. 7.
Figure 10:
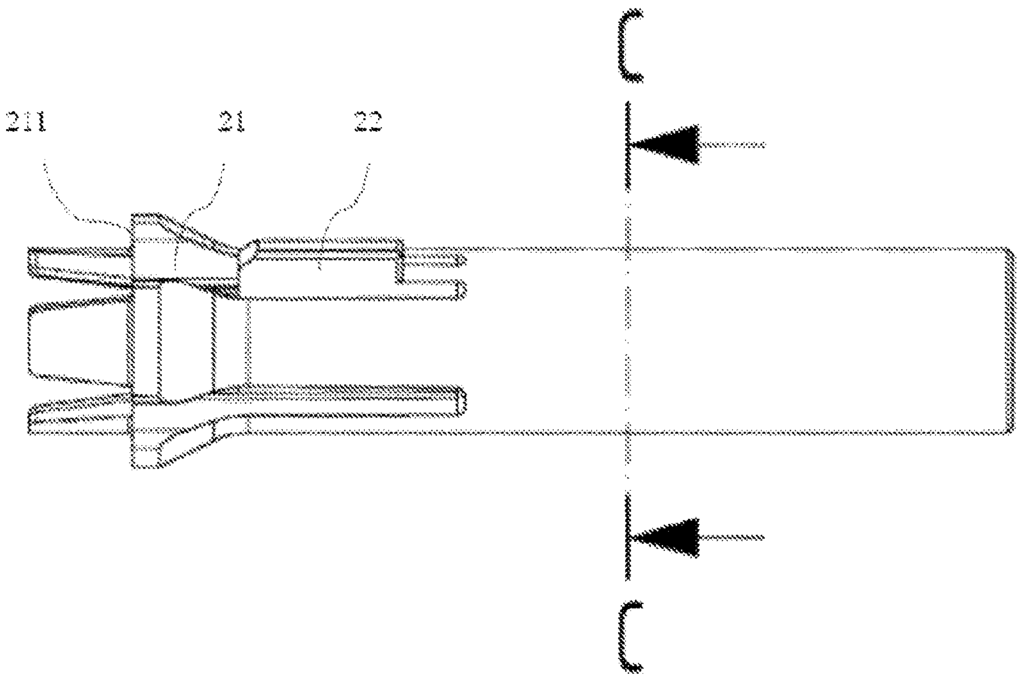
FIG. 10 is a plan view of the encoding part according to FIG. 9.
Figure 11:
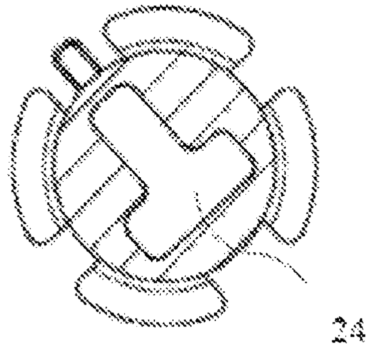
FIG. 11 is a cross-sectional view along line C-C according to FIG. 10.

FIG. 9 to FIG. 11 show detail views of the first encoding part 20. The first encoding part 20 has a cylindrical shape overall, and the first mating part 24 is arranged on the inner circumference at the close front end of the cylinder in the insertion direction. The first guide part 22 is arranged on the outer circumference at the close rear end of the cylinder in the insertion direction. The first guide part 22 can be arranged in the corresponding cut-out 12 in the female connector insert 10. On the rear end of the first mating part 24 in the insertion direction, first locking parts 21 are arranged, which are designed as multiple elastic parts, which are formed, for example, by cutting out multiple portions of the outer end portion of the cylinder. The elastic parts are inclined outward in a direction opposite the insertion direction, wherein the inclination angle is 10° to 65°. The first locking part 21 has the bearing face 211, which is used, as described above, to bear against the opening 11 in the female connector insert 10.

Figure 12:
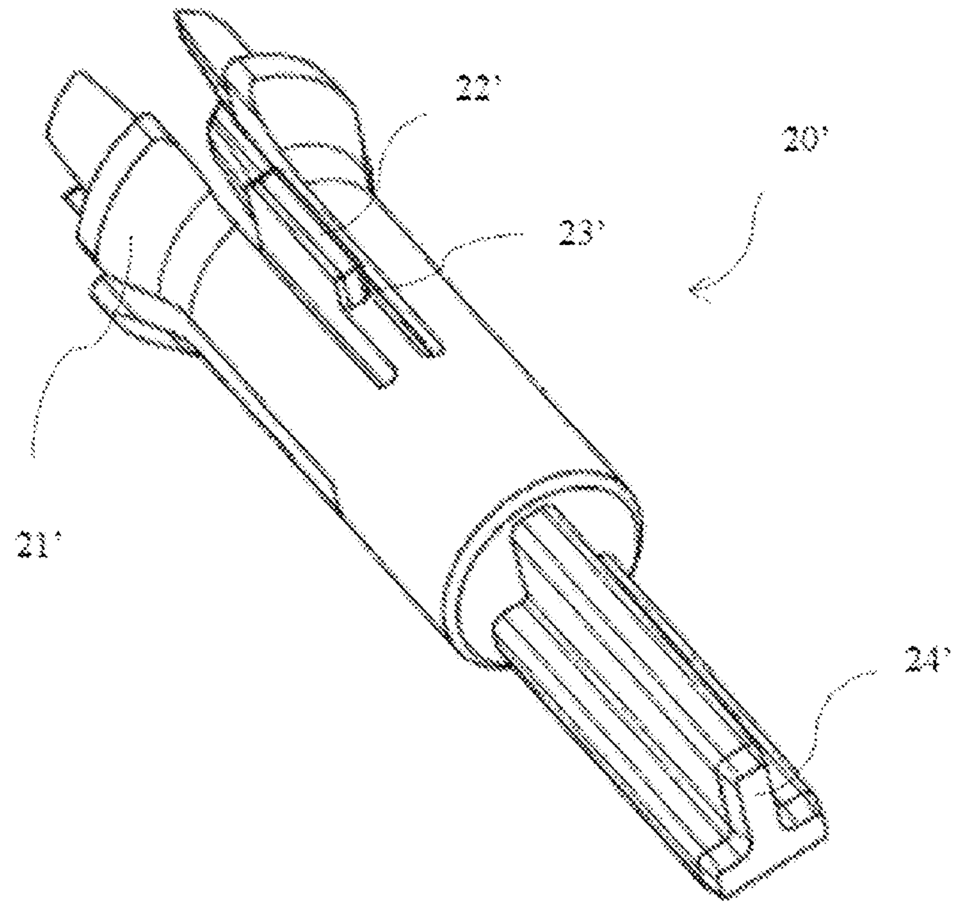
FIG. 12 is a perspective diagram of the encoding part according to FIG. 8.
Figure 13:
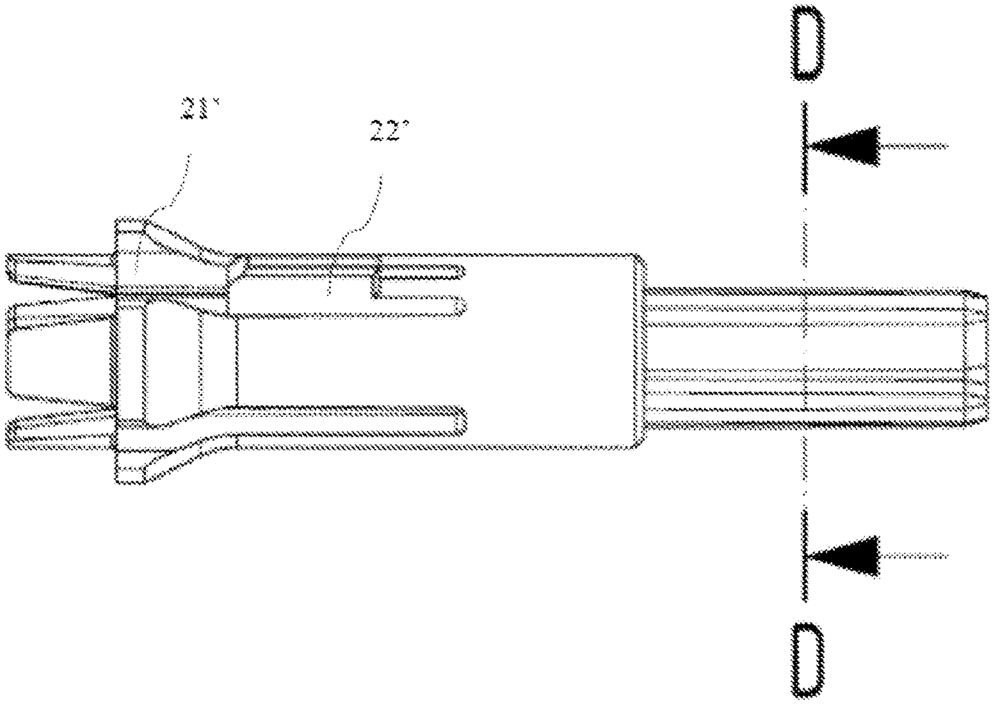
FIG. 13 is a plan view of the encoding part according to FIG. 12.
Figure 14:
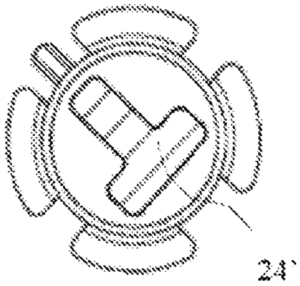
FIG. 14 is a cross-sectional view along line D-D according to FIG. 10.

FIG. 12 to FIG. 14 show detail views of the second encoding part 20'. The second encoding part 20' has a cylindrical shape overall, and the second mating part 24' is arranged on the close front end of the cylinder in the insertion direction. In this case, the second mating part 24' is designed as a T-shaped projection, which can be connected form-fittingly to the T-shaped groove in the first encoding part 20. The second guide part 22' is arranged on the outer circumference close to the rear end of the cylinder in the insertion direction and can be arranged in the cut-out 12' in the male connector insert 10'. On the rear end of the second mating part 24' in the insertion direction, second locking parts 21' are arranged, which are designed as multiple elastic parts, which are formed, for example, by cutting out multiple portions of the outer end portion of the cylinder. The second locking part 21' has the bearing face 211', which is used, as described above, to bear against the opening 11' in the male connector insert 10'.

For example, the cut-outs 12, 12' in the female connector insert 10 and in the male connector insert 10' for receiving the first guide part 22 and the second guide part 22' can be oriented in four directions a, b, c and d, so that the first guide part 22 and the second guide part 22' comprise four orientation options in the female connector insert 20, i.e., the encoding device comprises four orientation options in the connector insert assembly, wherein the first mating part 24 and the second mating part 24' can fit together only in one orientation. However, the present disclosure is not limited hereto. A person skilled in the art in this field shall understand that more or fewer than four orientation options can be provided.

A person skilled in the art in this field shall understand that the present disclosure is not limited to the details of the illustrated embodiments. Furthermore, the present disclosure can be implemented in other detailed embodiments. For example, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An encoding device, comprising:

a first encoding part; and a second encoding part, which are attached to a connector insert assembly, wherein the first encoding part is configured to be detachably installed in a first connector insert of the connector insert assembly in an insertion direction of the first connector insert that is oriented from a rear base end of the first connector insert to a front mating end of the first connector insert, wherein the second encoding part is configured to be detachably installed in a second connector insert of the connector insert assembly in an insertion direction of the second connector insert that is oriented from a rear base end of the second connector insert to a front mating end of the second connector insert, and wherein the first encoding part comprises a first mating part located at a front end of the first encoding part in an insertion direction of the first encoding part, and wherein the second encoding part comprises a second mating part located at a front end of the second encoding part in an insertion direction of the second encoding part, and wherein the first mating part and the second mating part are arranged such that, when the first connector insert is inserted into the second connector insert, the first mating part and the second mating part can only fit together in a single orientation to prevent mismatching between the first connector insert and the second connector insert.

2. The encoding device as claimed in claim 1, wherein the first mating part is configured as a slot that extends in the insertion direction of the first encoding part, wherein the second mating part is configured as a projection that extends in the insertion direction of the second encoding part, and wherein, when the projection is inserted into the slot, a rotation between the first encoding part and the second encoding part is prevented.

3. The encoding device as claimed in claim 2, wherein the slot is configured as an elongate T-shaped groove, wherein the projection is configured as an elongate T-shaped projection, and wherein an extension of the T-shaped projection in the insertion direction is smaller than an extension of the T-shaped groove in the insertion direction.

4. The encoding device as claimed in claim 1, wherein the first encoding part and the second encoding part each comprise a guide part, wherein the guide parts guide the first encoding part and the second encoding part into the corresponding connector insert.

5. The encoding device as claimed in claim 4, wherein the guide parts are each projections arranged on a periphery of the first encoding part and of the second encoding part, wherein the projections are each arranged close to a rear end of the first encoding part and of the second encoding part in the insertion direction, and wherein the projections fit into cut-outs in the corresponding connector insert, and wherein, when the first connector insert is inserted into the second connector insert, a front end of the projections in the insertion direction is blocked by a blocking part on the corresponding connector insert in order to prevent the first encoding part and the second encoding part being inserted further in the insertion direction.

6. The encoding device as claimed in claim 1, wherein the first encoding part and the second encoding part each comprise a locking part in order to lock the first encoding part and the second encoding part in the corresponding connector insert.

7. The encoding device as claimed in claim 6, wherein the locking parts are each situated on the rear end of the first encoding part and of the second encoding part in the insertion direction, wherein the locking parts are each formed in multiple elastic pieces, which are adjacent to one another, and wherein, when the first encoding part and the second encoding part are inserted into a correct position in the corresponding connector insert, the locking parts lock the first encoding part and the second encoding part in an axial direction on the corresponding connector insert via a spring force in order to prevent the first encoding part and the second encoding part detaching outward in a direction opposite the insertion direction.

8. The encoding device as claimed in claim 7, wherein the elastic pieces are inclined outward in a direction opposite the insertion direction, wherein an inclination angle is 10° to 65°.

9. A connector insert assembly, comprising:

an encoding device as claimed in claim 1.

* * * * *